US006959355B2

(12) United States Patent
Szabelski

(10) Patent No.: US 6,959,355 B2
(45) Date of Patent: Oct. 25, 2005

(54) UNIVERSAL SERIAL BUS HUB WITH SHARED HIGH SPEED HANDLER

(75) Inventor: Piotr Szabelski, Santa Clara, CA (US)

(73) Assignee: Standard Microsystems Corporation, Hauppauge, NY (US)

( * ) Notice: Subject to any disclaimer, the term of this patent is extended or adjusted under 35 U.S.C. 154(b) by 261 days.

(21) Appl. No.: 10/374,852

(22) Filed: Feb. 24, 2003

(65) Prior Publication Data

US 2004/0168009 A1 Aug. 26, 2004

(51) Int. Cl.[7] .................. G06F 13/00; G06F 13/20; G06F 13/38; G06F 13/42; G06F 3/00
(52) U.S. Cl. ................. 710/313; 710/2; 710/8; 710/20; 710/21; 710/33; 710/60; 710/62; 710/63; 710/64; 710/72; 710/73; 710/74; 710/104; 710/105
(58) Field of Search .................. 710/1, 2, 6, 8, 710/15, 20, 21, 33, 36, 52, 58, 60–64, 72–74, 104, 105, 313, 5, 7, 16–18, 29, 31, 38, 302; 711/100, 129, 130, 147, 150, 153

(56) References Cited

U.S. PATENT DOCUMENTS

| | | | | |
|---|---|---|---|---|
| 5,815,167 A | * | 9/1998 | Muthal et al. ............... 345/541 |
| 5,953,511 A | | 9/1999 | Sescila, III et al. | |
| 6,145,045 A | * | 11/2000 | Falik et al. ................. 710/129 |
| 6,185,641 B1 | * | 2/2001 | Dunnihoo .................. 710/56 |
| 6,205,501 B1 | * | 3/2001 | Brief et al. ................. 710/100 |
| 6,279,060 B1 | | 8/2001 | Luke et al. | |
| 6,304,995 B1 | * | 10/2001 | Smith et al. ................ 714/786 |
| 6,435,904 B1 | | 8/2002 | Herbst et al. | |
| 6,480,927 B1 | * | 11/2002 | Bauman ...................... 710/317 |
| 6,505,267 B2 | | 1/2003 | Luke et al. | |
| 6,671,765 B1 | * | 12/2003 | Karlsson et al. ............ 710/310 |
| 6,678,760 B2 | * | 1/2004 | Brief ............................ 710/52 |
| 6,816,929 B2 | * | 11/2004 | Ueda ........................... 710/56 |
| 2002/0154625 A1 | * | 10/2002 | Ma ............................ 370/351 |
| 2004/0153597 A1 | * | 8/2004 | Kanai et al. ................ 710/305 |
| 2004/0225808 A1 | * | 11/2004 | Govindaraman ........... 710/305 |

OTHER PUBLICATIONS

Cypress Semiconductor Corporation, "TetraHub™ High–speed USB Hub Controller," Publication No. CY7C6540, Dec. 5, 2002, 25 pages.

Compaq et al.; *Universal Serial Bus Specification*, Revision 2.0; Chapter 11: Hub Specification, Apr. 27, 2000, pp. 297–437 (Revision 2.0).

* cited by examiner

*Primary Examiner*—Fritz Fleming
*Assistant Examiner*—Tan Q Nguyen
(74) *Attorney, Agent, or Firm*—Meyertons Hood Kivlin Kowert & Goetzel, P.C.; Jeffrey C. Hood

(57) ABSTRACT

A device may include an upstream port and several downstream ports configured to transfer data at a different data transfer rate than the upstream port. The device may also include several downstream data handlers, each coupled to a respective one of the downstream ports, and an upstream data handler coupled to the upstream port. The data handlers are configured to implement a USB protocol. The upstream data handler is configured to provide data received via the upstream port to each of the downstream data handlers. Accordingly, the upstream data handler is shared between the various downstream data handlers.

9 Claims, 4 Drawing Sheets

UNIVERSAL SERIAL BUS HUB WITH SHARED HIGH SPEED HANDLER

BACKGROUND OF THE INVENTION

1. Field of the Invention

This invention relates to computer systems, and more particularly, to universal serial bus hubs used in computer systems.

2. Description of the Related Art

Components in computer systems communicate over various buses. One popular type of bus is the Universal Serial Bus (USB). The USB is a cable bus that allows a host computer to exchange data with a range of peripheral devices. USB peripherals share USB bandwidth through a host-scheduled, token-based protocol. A USB allows peripherals to be attached, configured, used, and detached while the host and other peripherals are in operation.

USB hubs allow multiple peripherals to be attached at a single host attachment point. Thus, a hub converts a single host attachment point into multiple peripheral attachment points. Each attachment point is referred to as a port. A hub typically includes an upstream port, which couples the hub to the host, and several downstream ports, which each couple the hub to another hub or peripheral. Each downstream port may be individually enabled and attached to a high-, full-, or low-speed device.

A USB hub typically includes a hub controller, a hub repeater, and a transaction translator. The hub repeater provides a USB protocol-controlled switch between the upstream port and downstream ports as well as support for reset and suspend/resume signaling. The host controller facilitates communication to and from the host. The transaction translator allows full- and/or low-speed downstream devices to communicate with a high-speed host. Typically, the number of transaction translators included in a USB hub limits the number of simultaneous transfers that can take place to full- and/or low-speed downstream devices used in a system with a high-speed host.

SUMMARY

Various embodiments of a method and apparatus for sharing a single upstream data handler between multiple downstream data handlers in a transaction translator for use in a USB hub are disclosed. In one embodiment, a device may include an upstream port and several downstream ports configured to transfer data at a different data transfer rate than the upstream port. The device may also include several downstream data handlers, each coupled to a respective one of the downstream ports, and an upstream data handler coupled to the upstream port. The data handlers are configured to implement a USB protocol. The upstream data handler is configured to provide data received via the upstream port to each of the downstream data handlers. Accordingly, the upstream data handler is shared between the various downstream data handlers.

In some embodiments, a method may involve: an upstream port of a USB (Universal Serial Bus) hub operating at a different transfer rate than each of several downstream ports of the USB hub; an upstream handler associated with the upstream port providing data received via the upstream port to each of several downstream handlers, where each of the downstream handlers is associated with a respective one of the downstream ports; and each of the downstream handlers providing data to a respective one of the downstream ports for output.

BRIEF DESCRIPTION OF THE DRAWINGS

Other aspects of the invention will become apparent upon reading the following detailed description and upon reference to the accompanying drawings in which.

Figure 1:
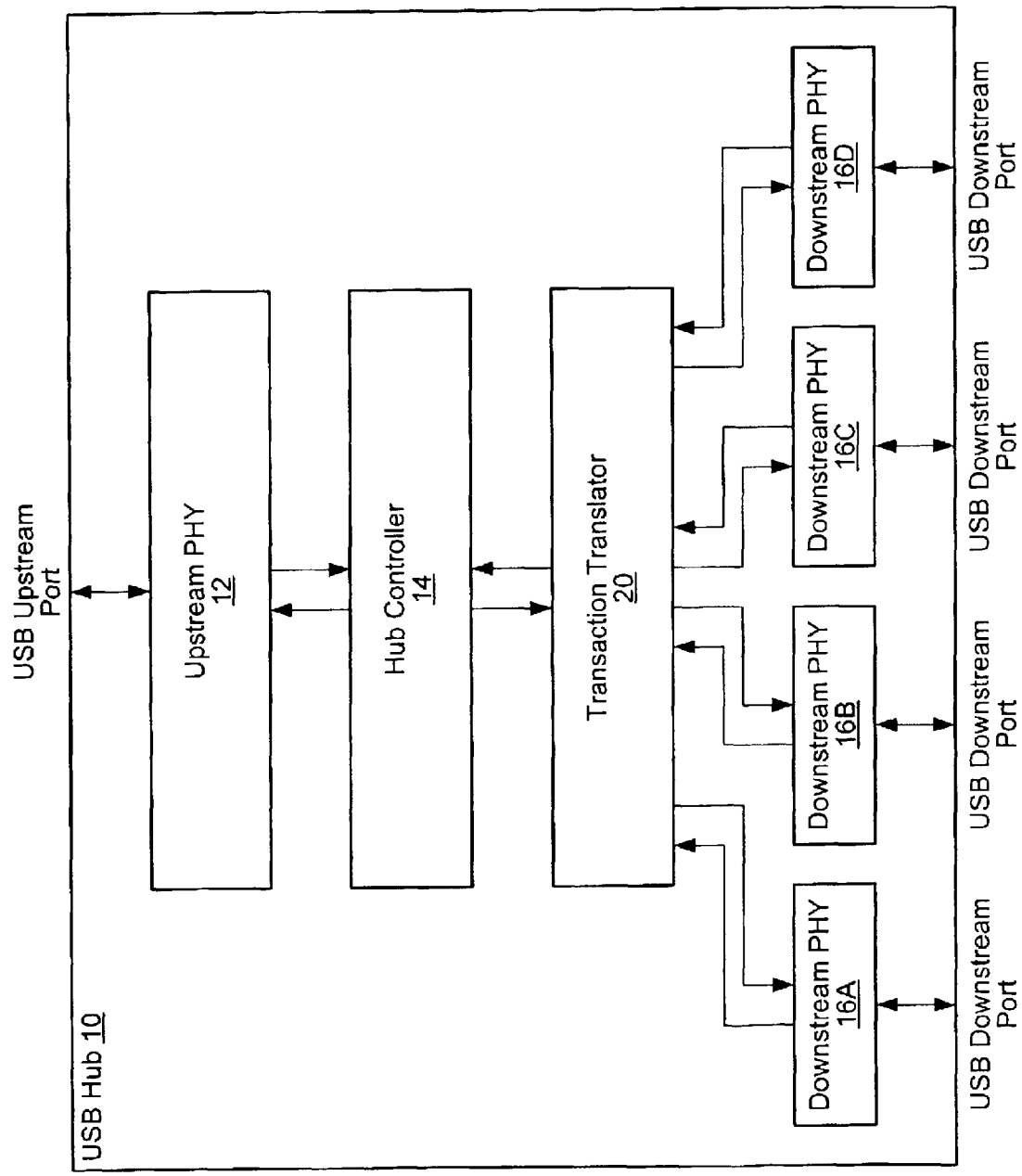
FIG. 1 shows a block diagram of a USB hub, according to one embodiment.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

A USB (Universal Serial Bus) hub may include transaction translator functionality to translate data streams for transfer between ports operating at different rates. When data is being transferred between ports operating at the same rate, the data handling devices may be inactive. The transaction translator may include an independent data handler for each downstream port. A single data handler at each upstream port may transfer data to and from each of the independent downstream data handlers.

A USB hub having a transaction translator that includes a single high speed handler and multiple full- and/or low-speed handlers may be used to couple various devices within a computer system. For example, a hub may couple a host to one or more devices such as: human interface devices such as mice, keyboards, tablets, digital pens, and game controllers; imaging devices such as printers, scanners, and cameras; mass storage devices such as CD-ROM drives, floppy disk drives, and DVD drives; and other hubs. An exemplary USB hub that implements a USB protocol is described with respect to FIGS. 1–4 herein.

FIG. 1 shows a block diagram of a USB hub 10, according to one embodiment. As shown, the USB hub 10 includes an upstream (e.g., facing toward a host) port and four downstream (e.g., facing away from a host) ports. Note that the number of ports may vary among embodiments. Each port is coupled to a physical layer device (PHY). Upstream PHY 12 couples the upstream port to the hub controller 14. Downstream PHYs 16A–16D (collectively, PHYs 16) couple a respective downstream port to transaction translator 20. When the upstream port is operating at high speed and a destination downstream port is operating at full or low speed, hub controller 14 may receive a high-speed data stream from upstream PHY 12 and provide the data to transaction translator 20. USB hub 10 may also handle transfers from downstream PHYs 16 to upstream PHY 12 by having transaction translator 20 transform a low- or full-speed data stream received via a downstream PHY 16 into a high-speed data stream for transmission via upstream PHY 12. Each port is an example of a means for receiving a serial data stream.

Note that the illustrated embodiment shows portions of a hub 10 configuration needed to allow a high-speed upstream device to communicate with one or more full- and/or low-speed downstream devices through the use of transaction translator 20. Hub 10 may also support communication between high-speed upstream devices and high-speed downstream devices and/or between full- and/or low-speed upstream devices and full- and/or low-speed downstream devices (e.g., via direct connection of the upstream PHY and downstream PHYs). The transaction translator 20 may be inactive if the upstream and downstream devices are operating at the same rate.

The number of downstream data handlers within transaction translator 20 may determine how many of the downstream PHYs 16 are able to transfer data at substantially the same time. For example, if there are four downstream data handlers within transaction translator 20, each PHY 16 may be able to transfer data at substantially the same time as the other PHYs 16 are transferring data.

Figure 2A:
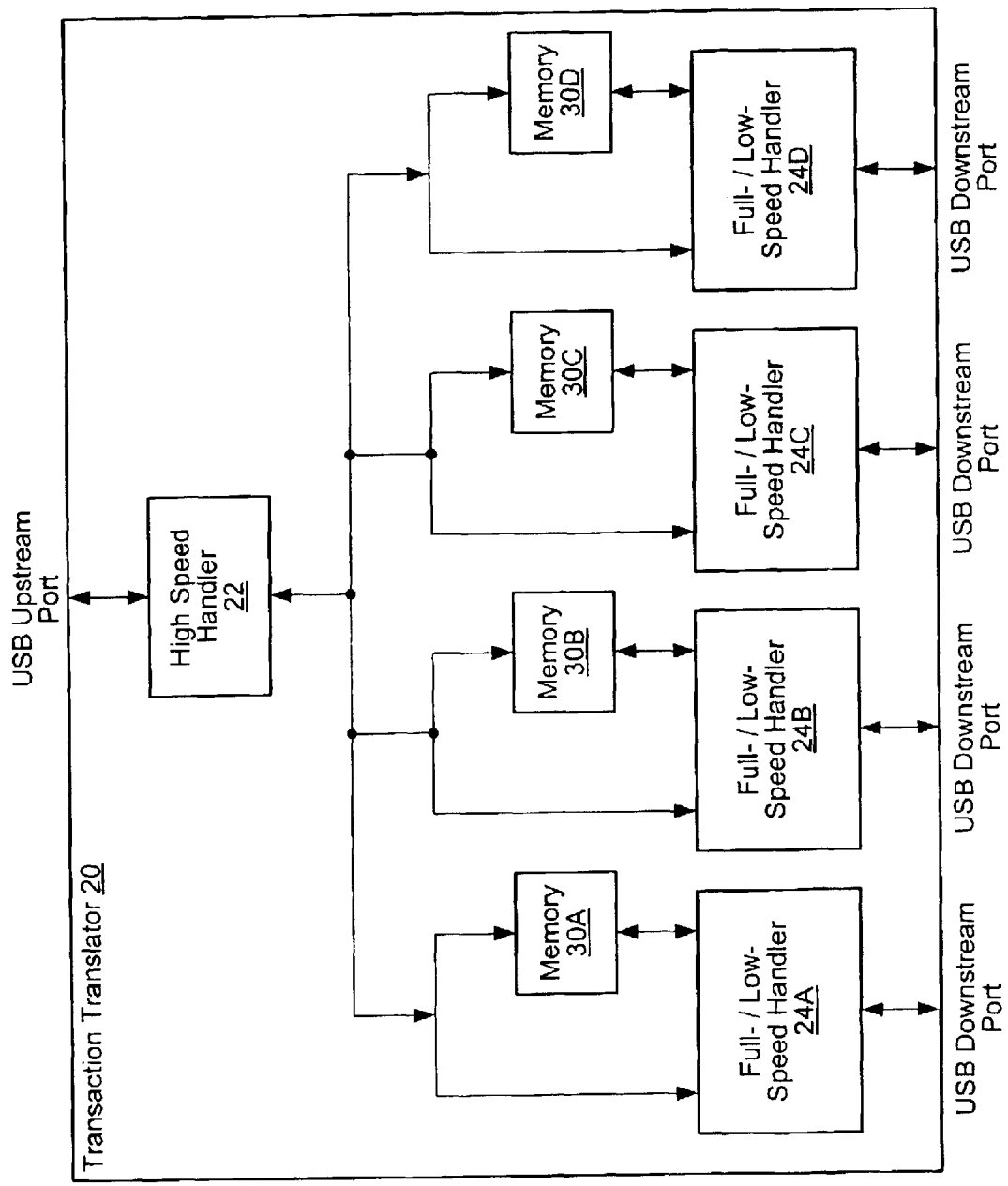
FIG. 2A is a block diagram of a transaction translator including multiple downstream data handlers that share a single upstream data handler, according to one embodiment.

FIG. 2A shows a block diagram of a transaction translator 20, according to one embodiment. The transaction translator includes a data handler 22 or 24 for each port. Instead of including an independent upstream data handler 22 for each downstream data handler 24, the upstream data handler 22 is shared between the downstream data handlers 24. By providing an independent data handler 24 for each downstream port, data may be transferred via each downstream port at substantially the same time. Note that in embodiments where multiple upstream ports are implemented, a separate high-speed handler 22 may be implemented for each upstream port. In such embodiments, each high-speed handler 22 may be shared between several downstream handlers 24.

When the upstream port is operating at high speed and the downstream ports are operating at full- and/or low-speed, transaction translator 20 may translate data streams between the different transfer rates. In the illustrated embodiment, if a high-speed data stream is being provided to transaction translator 20 via the upstream port, the high-speed handler may store the data into the memory device 30A–30D coupled to the destination full- and/or low-speed handler 24. For example, if the transaction translator 20 receives a high-speed data stream to be transferred to a low-speed device via the port coupled to downstream handler 24B, the upstream data handler 22 may store data received in that data stream in memory device 30B at a rate substantially similar to the rate at which the data is received. The downstream data handler 24B at the destination port may then read the data out of memory device 30B at a rate substantially similar to the rate at which data is transferred from the destination downstream port.

When a downstream device operating at full- or low-speed is sending data to an upstream device operating at high-speed, the data may be received via one of the downstream ports for transmission via the upstream port. For example, the data may be received via the downstream port coupled to data handler 24C. Data handler 24C may store the received data in memory device 30C. Data handler 22 may then output the data from memory device 30C at the higher rate via the upstream port. Other downstream data handlers 24 may operate similarly. Due to the inclusion of multiple downstream data handlers, each downstream data handler 24 may be receiving data from a downstream device at substantially the same time as another downstream data handler.

Figure 2B:
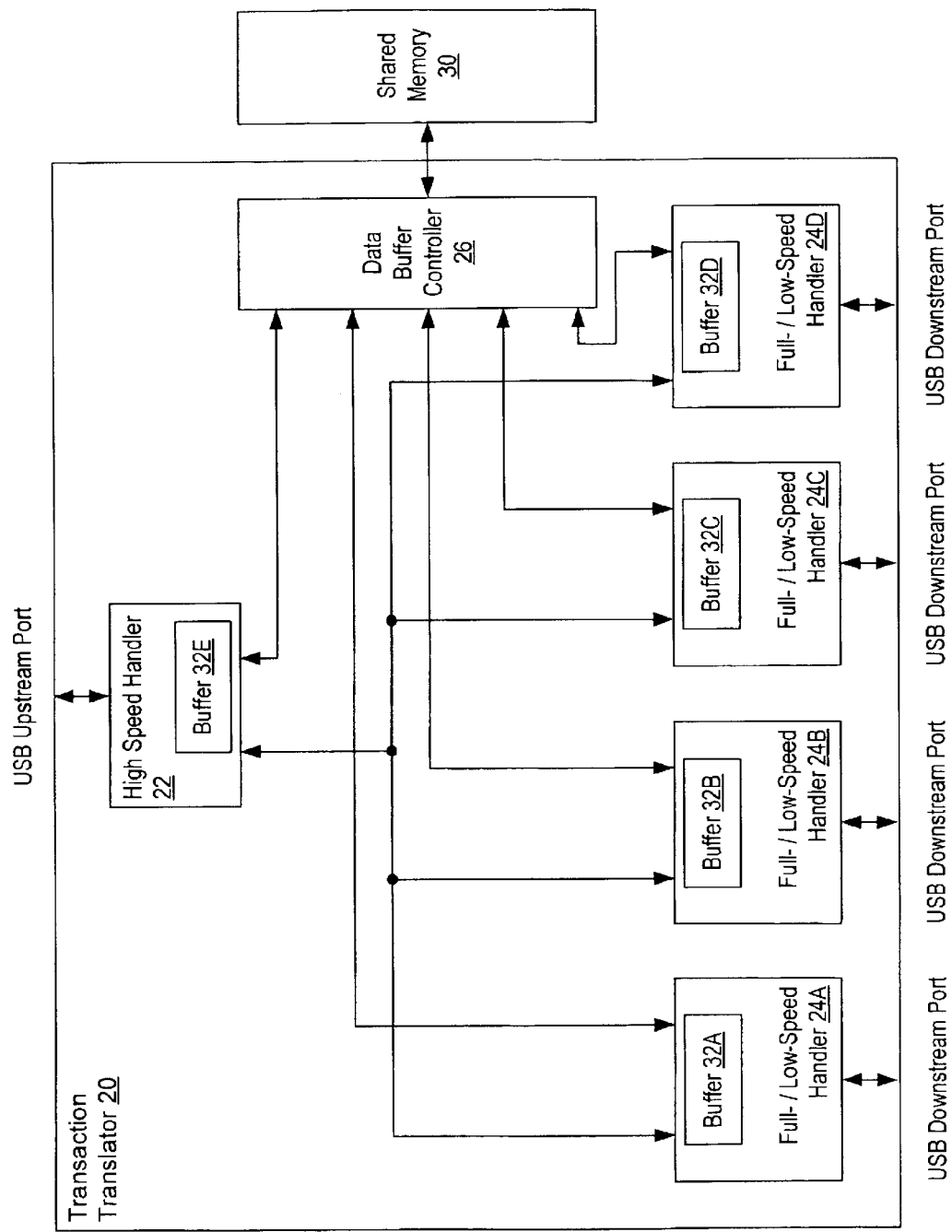
FIG. 2B is a block diagram of a transaction translator including multiple downstream data handlers that share a single upstream data handler and a single memory device, according to one embodiment.

FIG. 2B illustrates a block diagram of a transaction translator 20, according to another embodiment. In FIG. 2B, a single high-speed handler 22 is shared between several downstream handlers 24. The high-speed handler 22 is configured to send and receive a high-speed data stream via the upstream port.

In some embodiments, the transaction translator 20 may include a shared memory device 30 that is shared between the downstream data handlers 24, as shown in FIG. 2B. Each handler 22 and 24 is configured to send requests to access shared memory device 30 to data buffer controller 26. In the illustrated embodiment, shared memory device 30 is a single-ported memory device, and thus the high- and full-and/or low-speed handlers arbitrate for access to the shared memory device. Data buffer controller 26 is configured to arbitrate between the handlers' requests to determine which handler's request to provide to the shared memory device 30. Data buffer controller 26 may additionally perform address remapping on at least some of the handlers' requests in some embodiments. Note that in other-embodiments, the shared memory device 30 may have more than one port, thus allowing more than one data handler to access the shared memory device at substantially the same time.

Each handler 22 and 24 includes buffers 32 to store data being transferred to or from shared memory device 30 prior to transmitting that data to another handler or subsequent to receiving that data from one of the hub's ports. For example, high-speed handler 22 is configured to receive a high-speed stream of data via the upstream port. Portions of the received data may be temporarily buffered in buffer 32E while high-speed handler 22 arbitrates for access to shared memory 30. When access is granted, high-speed handler 22 transfers the buffered data to shared memory 30. In many embodiments, buffer 32E may include two independently accessible buffers so that incoming data can be stored in one buffer while data is written to shared memory device 30 from the other buffer area. High-speed handler 22 may also transmit information to the full- and/or low-speed handler 24 that the data stream is being transmitted to indicating the location of the data to be handled by that full- and/or low-speed handler. Alternatively, different portions of the shared memory 30 may be allocated to each full-and/or low-speed handler 24, allowing the high-speed handler 22 to indicate which handler 24 is the recipient of the data stream by writing the data into the portion of the shared memory 30 allocated to that handler.

When a data stream received by one of the full- and/or low-speed handlers 24 is being output by high-speed handler 22, the receiving full- and/or low-speed handler 24 may transmit information to the high-speed handler 22 indicating the location of the data in shared memory device 30. High-speed handler 22 may then arbitrate for access to shared memory device 30 and store a portion of the data in buffer 32E for transfer at the high-speed rate to the upstream port. As when high-speed handler 22 is receiving a high-speed data stream, the buffer 32E may include two independently accessible buffer areas so that data can be transferred to the upstream port from one buffer area while the other buffer area is being loaded with more data from shared memory device 30. Note that in other embodiments, buffer 32E may be a dual-ported device so that data can be transferred into and/or out of the buffer for transfers via the upstream port at substantially the same time as data is also being transferred to and/or from shared memory device 30.

As mentioned previously, there may be more than two independently accessible buffers in buffer 32E. The size of each buffer in buffer 32E may be the same as (or greater than) the amount of data accessible in shared memory device 30 by a single access request in some embodiments. In some embodiments, the size of the buffers 32E in the high-speed handler 22 may be larger than the size of buffers 32A–32D in the full- and/or low speed handlers 24.

Full- and/or low-speed handlers 24A–24D may each use their respective buffers 32A–32D in much the same way as high speed handler 22 when sending and receiving data via a respective downstream port.

Figure 3:
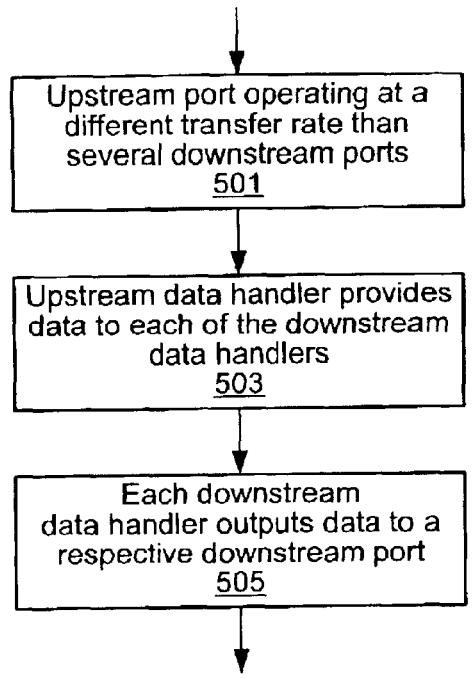
FIG. 3 is a flowchart of one embodiment of a method of operating a USB hub that includes multiple transaction translators that share memory.

FIG. 3 is a flowchart of one embodiment of a method of operating a serial bus hub that uses a shared upstream handler to transfer data to several downstream data handlers. Such a hub may be used to transfer data between connections that are operating at different rates. At 501, an upstream port of a USB (Universal Serial Bus) hub operates at a different transfer rate than each of several downstream ports of the USB hub. The upstream port may receive data from a host to be transferred to destination devices via the downstream ports. For example, an upstream port of the hub may receive data from the host in several different data transfers. Each transfer may involve data to be transferred to a different downstream port.

At 503, an upstream data handler associated with the upstream port provides data to each of the downstream handlers. For example, the upstream data handler may provide data received in one transfer from the host to one downstream handler and a data received in another transfer from the host to another downstream handler. The upstream handler may provide the data to the various downstream handlers by storing the data in various memory devices associated with the downstream handlers. Each of the downstream handlers is associated with a respective one of the USB hub's downstream ports. In response to receiving the data from the upstream data handler, each of the downstream handlers provides data to a respective one of the downstream ports, as indicated at 505. The data is then output at the downstream ports' transfer rate, which differs from the transfer rate of the upstream port.

USB Protocol

In many embodiments, a serial hub may be configured to implement the USB protocol, which defines a polled bus on which a host may initiate data transfers. Typical USB transactions involve several packets. The host initiates a transaction by sending a packet indicating the type and direction (upstream or downstream) of the transaction being initiated, the address of the target device, and an endpoint. If a downstream transfer is requested, the target device receives data transferred from the host. Similarly, if an upstream transfer is requested, the target device sends data to the host. A handshake packet may then be sent to the host from the target device to indicate whether the transfer was successful. The USB protocol describes the transfer between a source or destination on the host and an endpoint on a device as a pipe. Pipes may be either stream pipes or message pipes. Data transferred via a stream pipe has no USB-defined structure, unlike data transferred via a message pipe. Different pipes may have different bandwidths, speeds, and endpoint characteristics (e.g., sink or source, buffer size, etc.) and be used to transfer packets of different sizes.

Figure 4:
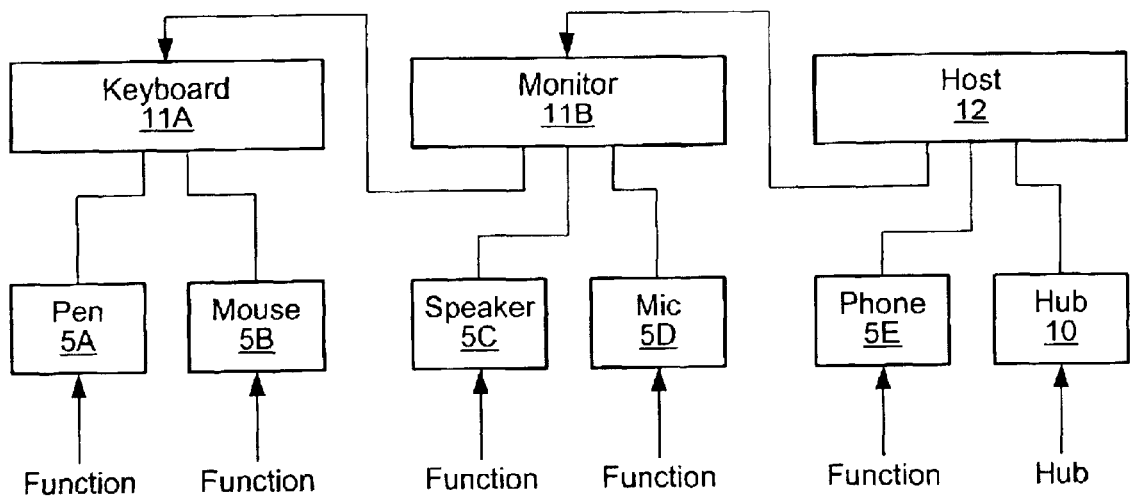
FIG. 4 is a block diagram of a system that includes one or more USB hubs.

FIG. 4 illustrates an exemplary computer system that may include one or more USB hubs 10 as described above. In the embodiment illustrated in FIG. 4, a hub included within host 12 couples directly to hub 10, phone 5E, and monitor 11B. Monitor 11B includes another hub, which couples directly to microphone 5D, speaker 5C and keyboard 11A. Keyboard 11A includes yet another hub, which couples directly to mouse 5B and pen 5A.

Any and/or all of the hubs shown in FIG. 4 may be implemented similarly to those described above. Typically, some of the hubs will connect functions operating at the same rate while other hubs will connect functions operating at different rates. Whenever a high-speed function communicates with a non-high-speed function via a hub, transaction translators included in the hub may be used to convert data streams between the different rates. Such transaction translators may share a memory device, as described above. Note that non-USB embodiments of a serial hub may be included in similar computer systems.

As shown in FIG. 4, several devices in a computer system may be coupled to a host by various USB connections. A device that is configured to transmit and/or receive data and/or control information over a USB connection may be referred to as a function. Functions are typically implemented as separate peripheral devices that connect to a USB connection, which in turn plugs into a port on a hub. In FIG. 4, exemplary functions include pen 5A, mouse 5B, speaker 5C, microphone 5D, and phone 5E. Some devices, referred to as compound devices, may be implemented in a single physical package that includes one or more functions and/or a hub. Exemplary compound devices in FIG. 4 include keyboard 11A and monitor 11B. All of these functions are coupled to host 12, which may also include a hub that allows the various functions to communicate with the host processor. An additional hub 10 may be coupled to the host in order to provide additional connectivity for other devices (e.g., cameras, printers, scanners, etc.).

Numerous variations and modifications will become apparent to those skilled in the art once the above disclosure is fully appreciated. It is intended that the following claims be interpreted to embrace all such variations and modifications.

What is claimed is:

1. A device, comprising:
   an upstream port configured to transfer data at a first data transfer rate;
   a plurality of downstream ports configured to transfer data at a different data transfer rate; and
   a transaction translator, comprising:
      a plurality of downstream data handlers, wherein each of the plurality of downstream data handlers is coupled to a respective one of the plurality of downstream ports; and
      an upstream data handler coupled to the upstream port and configured to provide data received via the upstream port to each of the plurality of downstream data handlers;
   wherein the transaction translator is configured to receive data through the upstream port at the first data transfer rate and transfer the data to the plurality of downstream ports at the different data transfer rate; and
   wherein the upstream data handler and the plurality of downstream data handlers are configured to implement a USB (Universal Serial Bus) protocol.

2. The device of claim 1,
   wherein the upstream data handler is configured to provide data to each of the plurality of downstream handlers by storing data in a plurality of memory devices; and
   wherein each of the plurality of memory devices is associated with a respective one of the plurality of downstream handlers.

3. The device of claim 1,
wherein the upstream data handler is configured to provide data to each of the plurality of downstream handlers by storing data in a shared memory device; and
wherein each of the plurality of downstream handlers is configured to retrieve data from the shared memory device for output via the respective one of the plurality of downstream ports.

4. The device of claim 1,
wherein each of the plurality of downstream data handlers is configured to provide data to a respective one of the plurality of downstream ports substantially simultaneously as another one of the plurality of downstream data handlers is providing data to a respective one of the plurality of downstream ports.

5. A method, comprising:
each of a plurality of downstream ports of a USB (Universal Serial Bus) hub operating at a different transfer rate than an upstream port of the USB hub;
an upstream handler associated with the upstream port providing data received via the upstream port to each of a plurality of downstream handlers, wherein each of the plurality of downstream handlers is associated with a respective one of the downstream ports, wherein the upstream handler and the plurality of downstream handlers are comprised in the same transaction translator; and
each of the plurality of downstream handlers providing data to a respective one of the downstream ports for output at the different transfer rate.

6. The method of claim 5,
wherein said providing data to each of the plurality of downstream handlers includes the upstream handler storing data in a plurality of memory devices; and
wherein each of the plurality of memory devices is associated with a respective one of the plurality of downstream handlers.

7. The method of claim 5, wherein said providing data to each of the plurality of downstream handlers includes the upstream handler storing data in a shared memory device, the method further comprising;
each of the plurality of downstream handlers retrieving a respective portion of the data from the shared memory device.

8. The method of claim 7,
wherein said providing data to the respective one of the downstream ports includes each of the plurality of downstream data handlers providing data to a respective one of the plurality of downstream ports substantially simultaneously.

9. The device of claim 1, further comprising:
an upstream physical layer device coupled to the upstream port;
a hub controller coupled to the upstream physical layer device and the transaction translator; and
a plurality of downstream physical layer devices coupled to the transaction translator and to the plurality of downstream ports.

* * * * *